June 29, 1965 H. G. CORNEIL 3,192,281
TEMPERATURE CONTROL IN HYDRODEALKYLATION
Filed March 23, 1961

INVENTOR.
HAMPTON G. CORNEIL,
BY
ATTORNEY.

United States Patent Office 3,192,281
                Patented June 29, 1965

3,192,281
TEMPERATURE CONTROL IN HYDRO-
DEALKYLATION
Hampton G. Corneil, Baytown, Tex., assignor, by mesne
  assignments, to Esso Research and Engineering Company, Elizabeth, N.J., a corporation of Delaware
        Filed Mar. 23, 1961, Ser. No. 97,820
             8 Claims. (Cl. 260—672)

The present invention relates to the hydrodealkylation of alkylated aromatic compounds. More particularly, the present invention deals with a method and means for controlling the temperature fluctuations within a thermal, non-catalytic hydrodealkylation reactor. In its most specific aspects, the present invention deals with a combination of a bed of inert, solid materials with a hydrogen cooling stream within the body of a hydrodealkylation reactor in order to minimize the temperature fluctuations and to control the maximum temperature reached during the passage of the reactants through said reactor.

The dealkylation of aromatic compounds substituted with one or more alkyl groups is highly exothermic when conducted in the presence of hydrogen at pressures from about 400 p.s.i.a. to about 800 p.s.i.a. and at temperatures from about 1000° F. to about 1600° F. The evolution of large quantities of heat by the exothermic reaction causes the temperature to rise rapidly while the reaction proceeds in the gaseous phase within the reactor, particularly where the reactor used is incapable of abstracting large amounts of heat from the reaction zone. The increase in temperature is intensified by the acceleration of the rate of reaction with rising temperature. The combination of this highly exothermic reaction with an accelerating reaction rate results in an exponential rise in temperature with respect to residence time in the reaction zone. Many undesirable results are caused by this rapid, uncontrolled exponential temperature rise within a hydrodealkylation reactor. For example, the side reactions which result in a degradation of the aromatic products and the deposition of large amounts of coke are particularly active at the higher temperatures.

As stated hereinabove and as more specifically set out hereinbelow, the present invention provides a means and method of controlling this highly exothermic reaction by a combination of two means. Firstly, the reactor is provided with at least one bed of inert solids which functions as a heat well to absorb heat from the reactants as the exponential temperature rise is initiated, to abstract heat from the reaction and thereby minimize the increase in reaction rate. The inert solids subsequently release the stored heat to the reactants following the heat surge, and which are not at the same advanced stage of the temperature-reaction rate phenomenon. This provides a damping effect on the fluctuations. Secondly, in conjunction with the bed of inert solids, there is provided at least one nozzle within the reactor whereby a stream of cool hydrogen may be introduced to counteract the release of heat and to reduce the temperature of the reactant stream. The nozzle may be advantageously placed upstream of the bed of inert solids so that the reactants being cooled by the stream of injected hydrogen may abstract the stored heat from the bed of inert material which had been absorbed from the reactants at the higher temperature. It should be noted that the injection of the cooling stream of hydrogen may be either constant during periods of normal operation of the reactor, or may be utilized at spaced intervals in order to combat the temporary surges of temperature which may occur during periods of upset. Manual or automatic control means may be provided for this purpose.

Thus, in accordance with the present invention, rather than experiencing a series of temperature surges, the reaction is so controlled that a substantially constant temperature is maintained throughout the reaction zone, the several beds of inert solids absorbing and giving up heat in a regular sequence and the injection of cool hydrogen therebetween further controlling the temperature and maintaining it substantially constant. In short, the reaction is controlled such that only hydrodealkylation of alkyl aromatic hydrocarbon prevails substantially throughout the reaction zone.

The use of a hydrogen cooling stream within the reactor is accompanied by several advantageous results. Firstly, the temperature of the reactants is lowered, combating the exponential rise in temperature with residence time and combating the increase in reaction rate which would normally be encountered. Secondly, the hydrodealkylation reactor is a net consumer of hydrogen, and without the injection of additional hydrogen into the reactor, the hydrogen concentration in the gaseous phase will tend to decrease to a minimum at the discharge end, with an accompanying increase in coke formation. By injecting the hydrogen into the reactor after the initiation of the hydrodealkylation reaction, this decline in hydrogen concentration may be offset, and the gaseous phase may be retained rich in the gaseous hydrogen, minimizing coke formation.

Suitable feed stocks for use in the practice of the present invention include alkylated aromatic hydrocarbons such as toluene, xylenes, trimethyl benzenes, ethyl benzene, diethyl benzenes, triethyl benzenes, propyl benzenes, methyl naphthalenes, dimethyl naphthalenes, trimethyl naphthalenes, ethyl naphthalenes, propyl naphthalenes, indane, tetralin, etc. It is to be understood that the suitable feed stock for the practice of the present invention normally will be obtained in the form of an admixture of several of the aforementioned feed stocks in combination with paraffin hydrocarbons or with non-alkylated aromatic hydrocarbon. For example, a suitable feed stock for naphthalene production may be naphthalene free and comprise about 15% to 25% methyl naphthalenes, about 20% to 30% heavier alkylated naphthalenes, about 15% to 25% condensed ring aromatics, about 20% to 30% alkyl benzenes, and about 10% to 15% non-aromatics. On the other hand, a high purity feed stock may be used. For example, a feed stock for benzene production may suitably comprise 99% toluene and 1% non-aromatics. It should be noted that the presence of alkylated cycloparaffins and cycloparaffins may also be accommodated in that these materials may be dealkylated and aromatized during their passage through the reactor.

The practice of the present invention may be appreciated more particularly by reference to the drawings wherein.

Figure 1:
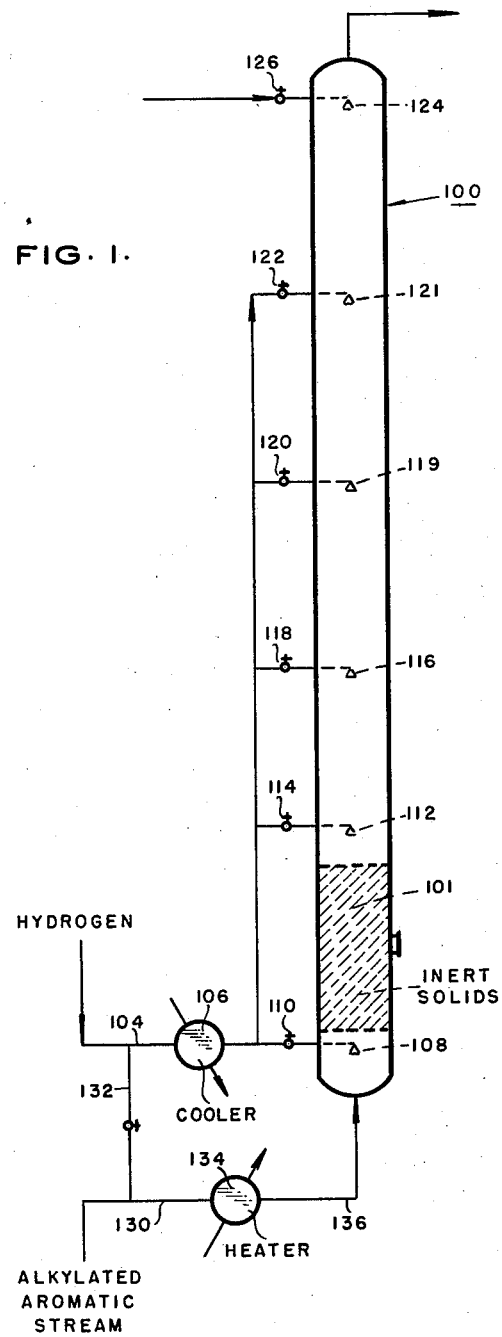
FIG. 1 represents a preferred means for carrying out the present invention.

Referring now to FIG. 1, the hydrodealkylation is accomplished in reactor 100 which is provided with a stationary bed of inert solids 101. These solids may be any of a number of materials inert to the hydrodealkylation reaction, for example, quartz, silica, mullite, sillimanite, beach sand, and powdered metals, and the particle size may range from about 0.1 inch to about 1.0 inch in diameter. The greatest increase in temperature is normally experienced at the entrance to the reactor, so the bed 101 may represent only about 5% to 10% of the reactor volume. The volume of the bed of solids may, however, range from about 5% of the void volume of the reactor to 100% when, of course, the reactor will be completely filled with inert solids. The preferred range of operation, however, will utilize solids in the bed to take up between 5% and 20% of the volume of the reactor. The bed 101 is supplemented by cold hydrogen streams which function to lower the temperature of the reactants flowing through the reactor 100. Hydrogen, for example, may be supplied by way of line 104, and may be cooled, if desired, in a cooler 106 before introduction into the reactor at several points; near the entrance to the reactor (by way of nozzle 108 controlled by valve 110), downstream of the bed of inert solids (such as through nozzle 112 controlled by nozzle 114), at about the 40% point in the reactor (such as through nozzle 116 controlled by a valve 118), at the 60% point (via nozzle 119 controlled by valve 120), and at the 80% point (via nozzle 121 controlled by valve 122). It should be noted that the positions of the various injection nozzles may be varied widely, but suitably may be located approximately at the entrance to the reactor and at 20% points along the length thereof. At the outlet to the reactor, a quench nozzle 124 is provided controlled by valve 126 through which a quench stream of water, steam, hydrogen, hydrocarbons, etc. may be introduced to lower the temperature of the effluent to a point below about 700° F. The alkylated aromatic stream is introduced into the the reactor 100 by way of line 130, admixed with hydrogen introduced through line 132 and is heated to a temperature approaching that at which the hydrodealkylation reaction is self-sustaining by passage through a heater 134. The admixture of alkylated aromatic hydrocarbons is introduced into the reactor through line 136 at a temperature of about 900° F. The normal operation of the reactor contemplates that no cooled hydrogen will flow through the nozzle 108, and that the inert solids in bed 101 will retain sufficient heat from the previously reacted material to raise the temperature of the reactants to a self-sustaining temperature of, for example, 1200° F. As the reaction continues and the temperature rises, additional heat is generated which must be counteracted by the introduction of a minor amount of hydrogen through the nozzle 112. The hydrogen introduced at this point may suitably be at a temperature of about 90° F. to 150° F., and may be introduced in amounts sufficient to maintain the reactor temperature at that point at about 1250° F. to about 1350° F. As the reaction continues and as the reaction stream passes sequentially through the reactor, additional amounts of cooled hydrogen may be introduced into the reactor through nozzles 116 and 119. The amount of hydrogen introduced at these points may be at the same temperature as the hydrogen introduced through nozzle 112, and will maintain the reactor temperature between 1250° F. and 1350° F. During periods of upset operation wherein the reaction threatens to become uncontrollable as it leaves the heater 134, hydrogen may be introduced through nozzle 108 in order to bring the temperature of the reaction within controllable limits. As the cooled hydrogen is introduced into the stream of flowing gases, and is carried into the bed of inert solids, the bed is reduced in temperature which will prolong and distribute the effect of the introduction of the cooling stream while also tending to reduce the fluctuation in temperature throughout the reactor. It should be understood that the inert solids perform no function of permanently removing or adding heat into the reactor, but serve merely as a heat reservoir in damping and smoothing out the effect of fluctuations in temperature which occur during the hydrodealkylation reaction, as well as damping and distributing the effect of the cooled hydrogen stream which is injected into the reactor.

The combination of the inert beds within the reactor and the introduction of chilled hydrogen at sequential points along the reactant path provides a novel and effective means for controlling the temperature gradations and fluctuations encountered in this highly exothermic reaction. The bed 101 may also be fluidized and maintained within the reactor as a dense phase occupying from about 10% to about 100% of the reactor volume. This type of operation provides a greater homogeneity in the temperature experienced within the reactor.

Figure 2:
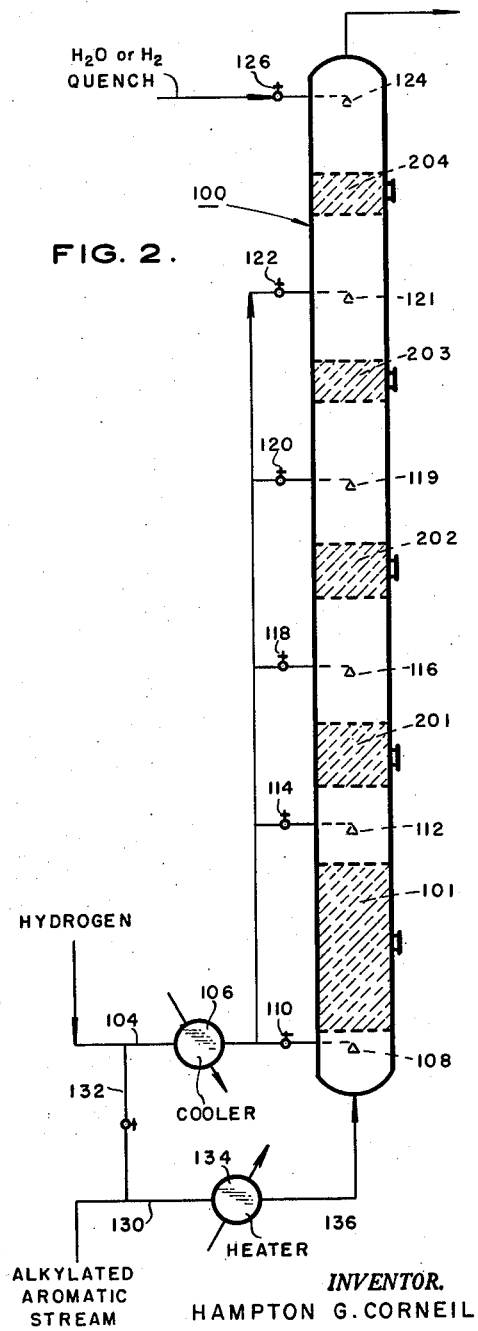
FIG. 2 is a modification of FIG. 1.

Referring now to FIG. 2, there is shown a modification of the reactor shown in FIG. 1, and wherein like elements are shown by the same reference numerals. In addition to the bed 101 of inert solids, however, there are also provided a plurality of other beds 201, 202, 203, and 204. It should be noted that the beds 201 through 204 are located between the nozzles 112, 116, 119, 121 and 124, to provide means for damping the cooling effect of the coolant issuing from these nozzles, as well as damping the temperature fluctuations occurring during the normal operation of the reactor 100. Again, as pointed out in the discussion of the operation of the embodiment shown in FIG. 1, the coolant nozzle 108 normally introduces no coolant into the reactor, but is used only when the temperature of the reactants leaving the heater 134 reaches a level which is conducive to extreme coking within the reactor. Also, as discussed in connection with the embodiment shown in FIG. 1, the coolant issuing from the nozzles 112, 116, 119, and 121 is supplied in quantities sufficient to maintain the temperature of the reaction with the reactor 100 at the desired level. It is contemplated in the embodiment of FIG. 2, as well as in the embodiment of FIG. 1, that the optimum maximum temperature should be reached at about the 20% point in passage through the reactor. Thus, the temperature should remain fairly constant from the point where the nozzle 112 is located until the reactants reach the quench nozzle 124. It should also be noted that the temperature at the various points may be suitably determined by the introduction of thermocouples into the reactor at the various points. By utilizing a series of beds such as disclosed in the embodiment of FIG. 2, temperature fluctuations throughout the reactor are maintained at a minimum, while yet maintaining a very low interference with the passage of the reaction products. It should be noted that the greatest rate of increase in temperature and reaction rate occurs at the entrance to the reactor, so that the bed 101 may suitably be formed larger in content than any of the other beds, or larger even than the sum of the contents of the remaining beds. It should also be noted that the total content of the inert solids within the beds may suitably be maintained within the range of about 5% to 10% of the reactor volume. It should be further noted in connection with FIG. 2, that if a reactor consisting of 100% packing with inert solids is used, as set out with respect to FIG. 1, there is no disengaging space within which a primary mixing of the coolant with the reactant streams can take place before contacting with the inert packing. By utilizing the embodiment of FIG. 2, however, the coolant is enabled to admix with the reactant stream before striking the inert packing, and thus to be distributed more widely and evenly throughout the flowing stream, giving an extremely good control over temperature fluctuations within the flowing stream. It is also contemplated that the various beds in FIG. 2 could be maintained in the fluidized state as well as stationary.

Having disclosed in detail the essence of the present invention, as well as a preferred mode of carrying forth the same, the scope of the present invention should be determined not by the specific example presented, but by the appended claims.

I claim:
1. A method for minimizing fluctuations in temperature during the non-catalytic thermal hydrodealkylation of a hydrocarbon stream containing an alkylated aromatic hydrocarbon which comprises
  admixing said alkylated aromatic hydrocarbon-containing stream with a first hydrogen-rich stream to form a reactor charge stream,
  passing said reactor charge stream through an elongated reaction zone provided with at least one bed of inert solids,
  said reaction zone being maintained under hydrodealkylation conditions,
  and introducing a second hydrogen-rich stream into said reaction zone upstream of said bed of inert solids, said second stream of hydrogen being at a temperature lower than the temperature of said reaction zone at the point of introduction thereof, and being introduced in amounts sufficient to offset the heat of reaction generated by the hydrodealkylation reaction.

2. A method in accordance with claim 1 wherein the hydrodealkylation reaction is accomplished at a temperature within the range of about 1000° F. to about 1600° F., at a pressure within the range of about 400 to about 1000 p.s.i.g., in the presence of about 2000 to about 10,000 s.c.f. of $H_2$ per barrel of hydrocarbon feed.

3. A method in accordance with claim 2 wherein the second hydrogen rich stream is injected at a temperature of about 90° F. to about 150° F.

4. A method in accordance with claim 2 wherein the inert bed is maintained in the fluidized state.

5. A method for minimizing temperature fluctuations during the non-catalytic thermal hydrodealkylation of an alkylated aromatic hydrocarbon which comprises admixing said alkylated aromatic hydrocarbon with a first hydrogen-rich stream to form a reactor charge stream, passing said reactor charge stream through an elongated reaction zone provided with a plurality of spaced beds of inert solids, and injecting into concurrent flow with said hydrocarbon at points between said beds a plurality of streams of hydrogen at a temperature lower than that of said reaction zone at the point of injection thereof, in amounts sufficient to offset the heat of reaction generated by the hydrodealkylation reaction, whereby the beds of inert solids absorb and give up heat during temperature fluctuations of said reaction to minimize the effect thereof.

6. A method of minimizing temperature fluctuations during the thermal non-catalytic hydrodealkylation of an alkylated aromatic hydrocarbon which comprises
admixing said alkylated aromatic hydrocarbon and a first hydrogen-rich stream to form a reactor charge stream having a temperature of about 900° F.,
passing said reactor charge stream through an elongated reaction zone provided with at least one bed of inert solids
under hydrodealkylation conditions including a temperature within the range of about 1000° F. to about 1600° F., a pressure within the range of about 400 p.s.i.g. to about 1000 p.s.i.g., and a hydrogen-to-hydrocarbon ratio within the range of about 2000 s.c.f./b. to about 10,000 s.c.f./b.
and introducing a second hydrogen-rich stream into said reaction zone upstream of said bed of inert solids,
said second hydrogen-rich stream being at a temperature within the range of about 90° F. to about 150° F.,
in amounts sufficient to maintain the reaction zone temperature at the point of injection within the range of about 1250° F. to about 1350° F.

7. A method in accordance with claim 6 wherein the reaction zone comprises a plurality of beds of inert solids and a plurality of hydrogen-rich streams are introduced at points intermediate said bed of inert solids.

8. A method in accordance with claim 6 wherein said bed of inert solids is maintained in the fluidized state.

References Cited by the Examiner
UNITED STATES PATENTS

| | | | |
|---|---|---|---|
| 2,422,673 | 6/47 | Haensel et al. | 260—672 |
| 2,993,855 | 7/61 | Fear | 208—213 |

FOREIGN PATENTS

| | | |
|---|---|---|
| 790,595 | 2/58 | Great Britain. |

ALPHONSO D. SULLIVAN, *Primary Examiner.*

DANIEL E. WYMAN, JOSEPH R. LIBERMAN,
*Examiners.*